Dec. 27, 1932.    B. DE GERONIMI    1,892,424
MOVING PICTURE SCREEN
Filed Nov. 13, 1928

Inventor:
Baldano de Geronimi
By [signature]
Atty.

Patented Dec. 27, 1932

1,892,424

UNITED STATES PATENT OFFICE

BALDANO DE GERONIMI, OF GENOA, ITALY

MOVING PICTURE SCREEN

Application filed November 13, 1928, Serial No. 319,192, and in Germany May 9, 1928.

This invention relates to screens for cinematographic projection apparatus.

Nowadays, moving picture screens are commonly constructed with linen or canvas smeared over with any kind of white paint and white paper superposed thereon, this however, causes pictures to appear out of focus at the angles and sides.

This defect is due to the lack of uniformity of the substances spread over the screen, which also cause deficient luminosity, only the centre of the screen being sufficiently clear, whilst at the sides there are dark zones that do not distinctly show the details.

In order to overcome these defects and interference of vision and trembling, it is necessary to resort to a strong ampere power which, even if it partly overcomes the deficient luminosity of the screen, brings about, on the other hand, a decrease of clearness and a want of precision in the outlines and a serious danger of the film catching fire, with consequent disastrous results.

Besides, in the case of screens now in use, when the line of vision of the onlooker forms an angle of refraction with the screen the geometrical figures and images appear deformed and confused.

These deficiencies and defects of reflection are entirely overcome in the screen according to my invention which has the following characteristics:—

(1) A perfectly uniform and completely smooth surface obtained by special successive applications of various mixtures;

(2) Increased luminosity giving a great saving of electrical energy.

Figure 1:
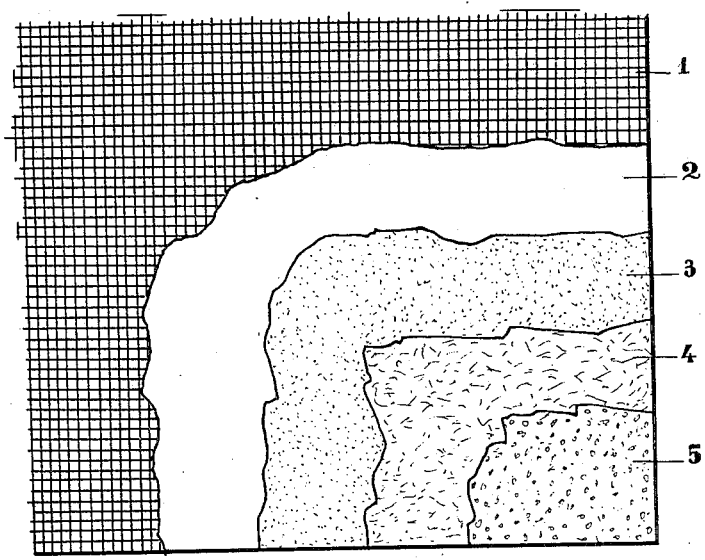
Figure 2:
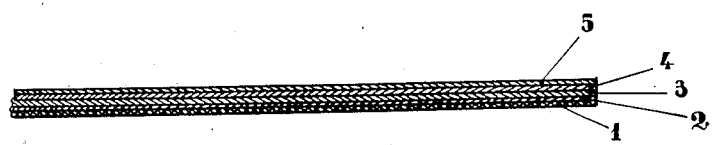

In order to obtain these characteristics I proceed as follows, reference being made to the accompanying drawing in which Figure 1 shows diagrammatically in plan view the superposition of the various layers, and Figure 2 shows a corresponding section.

In order to fill up the porousness of the base fabric 1 I make a first hot application of isinglass or totin gum 2 dissolved in hot water, in the proportion of 7%.

When this first application is dry, I apply as a groundwork, possibly by means of a compressed air sprinkler, a first layer of a composition 3 formed by mixing:—

40 parts of a mixture composed of 50% zinc sulphide (ZnS) and 50% of barium sulphate ($BaSO_4$).

10 parts of white asbestos reduced to impalpable powder.

40 parts of zinc oxide (ZnO).

10 parts of barium sulphate ($BaSO_4$).

This composition has to be kneaded with 12 to 14 parts of decoloured linseed oil then the whole mixed with 20 parts of a liquid composed of:—

40 parts of decolored boiled linseed oil;

10 parts of fresh neutral linseed oil mixed with 30% of soya oil, and the whole decoloured.

20 parts of raw decoloured linseed oil;

10 parts of terebine a drier composed of rosin substances (oil rosin acids), of cobalt, sulphate of iron and essence of turpentine (pinene).

(30 Co, 10 $FeSO_4$ 60 $C_{10}H_{14}$).

20 parts of turpentine.

This composition is not corrosive; it stands heat and is not affected by sulphur containing gases or by atmospheric agents or especially by light, in fact on a test made three years after being applied and exposed to the open air it was found as white and smooth as it was on the day of its application.

This composition being moreover almost as glossy as enamel begins to give a basis to the luminosity of the screen.

When this first application is dry, I apply a second and then a third coating of the same composition 3, so that the surface is perfectly covered without leaving any parts or spots that are not glossy owing to absorption.

I then varnish the screen with two applications of a composition 4 formed as follows:—

100 parts of zinc oxide (ZnO).

100 parts of a liquid composed of:

10 parts of decoloured liquid drier terebine, 70 parts of fresh neutral linseed oil mixed with 30% of soya oil and the whole decoloured.

20 parts of turpentine.

Before the surface is perfectly dry after the second application of the varnish, I sprinkle the surface with aluminum or other composition reduced to impalpable powder, for the purpose of preventing the glare that may be produced by too intense luminosity of the screen. After powdering I remove the screen to a room suitable for the drying process which has to last not less than 60 days.

So far I have dealt with the application of the process to cloth, as being the most interesting and practicable, because it can be rolled up, but the same method of working can be followed, with identical results, by applying the process to any surface, namely: walls, wood, iron, zinc, steel, etc. after a suitable preparation of the surface on which the above preparations are to be applied.

By preparing the screen in this manner, which also eliminates inconvenience due to the rays of refraction, the screen absorbs hardly any of the luminous rays, and gives the maximum yield for the luminous energy employed, with a reflecting capacity of diffused white or coloured light which is perceived by the general economy in the consumption.

In the projection of films, a saving of about 60% of energy (power) is obtained. This economy and clearness has up to the present not been obtainable even with the mirror arches of the most improved cinematographic machines. The reduction of the necessary amperage brings with its also a diminution of the risk of fire in the film, and is therefore, besides the economical saving by the reduction of power required; of importance from the point of view of public safety. Also the Voltaic arc may be replaced by 600 watt lamps in premises having a shorter distance than 30 metres from the operating cabin to the screen, and 1000 watt lamps and over, for premises having a greater length, which still more increases the safety of working.

I claim:—

1. A screen for cinematograph and similar projections comprising a base, a filling coating applied thereto, three coats of a white paint applied to the filling coating and containing zinc sulphide, zinc oxide, barium sulphate and finely powdered white asbestos, two coats of a slow drying varnish applied to the last coat of white paint, and a covering of a white metallic powder applied to the second coat of varnish.

2. A screen for cinematograph and similar projections comprising a fabric base, a coating of isinglass or totin gum applied thereto, three coats of a white paint applied to the filling coating and containing zinc sulphide, zinc oxide, barium sulphate and finely powdered white asbestos, two coats of a slow drying varnish applied to the last coat of white paint, and a covering of a white metallic powder applied to the second coat of varnish.

3. A screen for cinematograph and similar projections comprising a base, a filling coating applied thereto, three coats of a white paint applied to the filling coating and containing zinc sulphide, zinc oxide, barium sulphate and finely powdered white asbestos, two coats of a slow drying varnish applied to the last coat of white paint, and a covering of powdered aluminium applied to the second coat of varnish.

4. A projecting screen comprising a base a filling coating applied thereto, three coats of a white paint applied to the filling coating and containing zinc sulphide, zinc oxide, barium sulphate and finely powdered white asbestos applied with a mixture of decoloured boiled linseed oil, fresh neutral linseed oil, soya oil, liquid drier and turpentine, two coats of a slow drying varnish applied to the last coat of white paint, and a covering of a white metallic powder applied to the second coat of varnish.

5. A projecting screen comprising a base, a filling coating applied thereto, three coats of a white paint applied to the filling coating and containing zinc sulphide, zinc oxide, barium sulphate and finely powdered white asbestos, two coats of a varnish applied to the last coat of white paint and comprising zinc oxide applied with a mixture comprising a decoloured mixture of fresh neutral linseed oil and soya oil, turpentine, and decoloured liquid drier, and a covering of a white metallic powder applied to the second coat of varnish.

6. A projecting screen comprising a fabric base, a coating of isinglass or totin gum applied thereto, a plurality of coats of a white paint applied to the filling coating and containing zinc sulphide, zinc oxide, barium sulphate and finely powdered white asbestos applied with a mixture of decoloured boiled linseed oil, fresh neutral linseed oil, soya oil, liquid drier and turpentine, a plurality of coats of a varnish applied to the last coat of white paint and comprising zinc oxide applied with a mixture comprising a decoloured mixture of fresh neutral linseed oil and soya oil, turpentine and decoloured liquid drier, and a covering of powdered aluminium applied to the last coat of varnish.

In testimony whereof I have signed my name to this specification.

BALDANO DE GERONIMI.